United States Patent
Sakimoto et al.

(10) Patent No.: US 8,117,833 B2
(45) Date of Patent: Feb. 21, 2012

(54) METHOD AND SYSTEM USING A REDUCTION CATALYST TO REDUCE NITRATE OXIDE

(75) Inventors: Masatsugu Sakimoto, Frankfurt (DE); Hiromu Sugano, Higashi-hiroshimashi (JP); Masaru Yamamoto, Hatsukaichi (JP); Shoichi Toyokawa, Higashi-hiroshimashi (JP); Masashi Naono, Hiroshima (JP); Kouta Matsue, Higashi-hiroshimashi (JP); Chikara Ishihara, Aki-gun (JP); Hiroaki Ishida, Hatsukaichi (JP); Daisuke Higaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 612 days.

(21) Appl. No.: 12/269,742

(22) Filed: Nov. 12, 2008

(65) Prior Publication Data

US 2009/0120068 A1 May 14, 2009

(30) Foreign Application Priority Data

Nov. 14, 2007 (JP) ................................. 2007-295171

(51) Int. Cl.
*F01N 3/00* (2006.01)
(52) U.S. Cl. ................ 60/295; 60/274; 60/286; 60/297; 60/301; 60/303
(58) Field of Classification Search .................... 60/274, 60/278, 280, 285, 286, 295, 297, 301, 303
See application file for complete search history.

(56) References Cited

U.S. PATENT DOCUMENTS

| | | | |
|---|---|---|---|
| 6,237,326 B1 * | 5/2001 | Russell | 60/274 |
| 6,681,565 B2 * | 1/2004 | Russell | 60/286 |
| 6,805,849 B1 | 10/2004 | Andreasson et al. | |
| 7,178,331 B2 * | 2/2007 | Blakeman et al. | 60/301 |
| 7,765,798 B2 * | 8/2010 | Bruck | 60/286 |
| 2009/0165442 A1 * | 7/2009 | Hara | 60/286 |

FOREIGN PATENT DOCUMENTS

| | | | | |
|---|---|---|---|---|
| EP | 1 179 667 A2 | 2/2002 | | |
| JP | 2002047974 A | 2/2002 | | |
| JP | 02002250220 A | * | 9/2002 | 60/286 |
| JP | 2003232218 A | 8/2003 | | |
| JP | 2007154849 A | 6/2007 | | |
| JP | 2008106709 | 5/2008 | | |
| WO | 2004/061278 | 7/2004 | | |

OTHER PUBLICATIONS

ISA European Patent Office, Search Report of EP 08 01 9644, Nov. 4, 2009, Netherlands, 5 pages.

* cited by examiner

*Primary Examiner* — Binh Q Tran
(74) *Attorney, Agent, or Firm* — Alleman Hall McCoy Russell & Tuttle LLP

(57) ABSTRACT

A method of controlling a system having an internal combustion engine, a filter in an exhaust passage, a reduction catalyst downstream of said filter capable of reducing nitrate oxide contained in the exhaust gas with reductant supplied thereto is provided. The method may include, in a first mode, combusting a first amount of particulate matter trapped in said filter and supplying a first amount of reductant to said reduction catalyst when an amount of particulate matter trapped in said filter is less than a predetermined trapping amount (α). The method may further include, in a second mode, combusting a second amount of particulate matter that is greater than said first amount of particulate matter and supplying a second amount of reductant to said reduction catalyst when an amount of particulate matter trapped in said filter is equal to or greater than said predetermined trapping amount (α).

9 Claims, 6 Drawing Sheets

METHOD AND SYSTEM USING A REDUCTION CATALYST TO REDUCE NITRATE OXIDE

TECHNICAL FIELD

The present description relates to an exhaust-gas treatment system or a method for operating an exhaust-gas treatment system for an internal combustion engine. More particularly, the description relates to an exhaust-gas treatment system and a method for operating an exhaust-gas treatment system to decrease nitrogen oxide ($NO_x$) contained in the emissions from an internal combustion engine.

BACKGROUND AND SUMMARY

Using an urea-SCR (Selective Catalytic Reduction) system is known as a technology for reducing $NO_x$ contained in the emissions from an internal combustion engine. This technology provides a selective reduction catalyst in an exhaust passage from an engine for reducing $NO_x$, and provides an urea aqueous solution injection nozzle upstream of the selective reduction catalyst for injecting urea aqueous solution (herein referred to as reductant) in the exhaust passage. The urea aqueous solution injected from the nozzle is thermally decomposed or hydrolyzed into ammonia by heat from exhaust gas, then, the ammonia is adsorbed into the selective reduction catalyst and reduces $NO_x$ to give nitrogen ($N_2$) and water ($H_2O$) by a denitrating reaction with $NO_x$ in exhaust gas.

Some systems have a particulate filter in an exhaust passage to decrease a particulate matter such as soot contained in the emission. This particulate filter can trap particulate matter in the emission. In this regard, it is known by Japanese Unexamined Patent Application Publication No. 2003-232218 or U.S. Pat. No. 6,805,849 B1, for example that a selective reduction catalyst may be arranged downstream of an oxidation catalyst and a particulate filter to avoid poisoning a selective reduction catalyst with sulfur oxides and/or emitted particulate matter.

However, the inventors herein have discovered the following issue that can occur in a system wherein a selective reduction catalyst reducing $NO_x$ in the emission by receiving reductant, such as urea, is arranged downstream of particulate filter along an exhaust passage.

In the case that a particulate filter is provided in an exhaust passage, and when it is determined that an amount of particulate matter trapped in a particulate filter is larger than a predetermined amount, combusting and removing a particulate matter from a particulate trap, which is referred to as filter regeneration, is executed by combusting unburned fuel or using a heater to heat the particulate, for example. However, when particulate matter is combusted and removed from a particulate filter during the regenerating period, a higher temperature exhaust gas flows into a selective reduction catalyst compared to a lower temperature exhaust gas flow into a selective reduction catalyst during a non-regeneration period. As a result, the ability of the catalytic component contained in a selective reduction catalyst may be decreased, resulting in decreased $NO_x$ conversion efficiency of a selective reduction catalyst, and unreduced $NO_x$ may be emitted into an atmosphere.

This description addresses this issue. In particular, the description can address an issue that may occur when a selective reduction catalyst in the exhaust, receiving reductant, is arranged downstream of a particulate filter along an exhaust passage. The techniques described herein can potentially avoid $NO_x$ emitting into the atmosphere even when $NO_x$ conversion efficiency of a selective reduction catalyst is decreased during combustion and removal of particulate matter trapped in a particulate filter.

A first aspect of the present description includes a method of controlling a system having an internal combustion engine, a filter arranged in an exhaust passage and capable of trapping particulate matter contained in the exhaust gas from said internal combustion engine, a reduction catalyst arranged in said exhaust passage downstream of said filter and capable of reducing nitrate oxide contained in the exhaust gas with reductant supplied thereto, the method comprising: in a first mode, combusting a first amount of particulate matter trapped in said filter and supplying a first amount of reductant to said reduction catalyst when an amount of particulate matter trapped in said filter is less than a predetermined trapping amount; and in a second mode, combusting a second amount of particulate matter trapped in said filter that is greater than said first amount of particulate matter and supplying a second amount of reductant that is greater than said first amount to said reduction catalyst when an amount of particulate matter trapped in said filter is equal to or greater than said predetermined trapping amount.

This method overcomes at least some of the disadvantages of the above mentioned reference.

When a particulate matter trapped in a particulate filter is combusted and removed from a particulate filter, an amount of reductant supplied to said reduction catalyst can be increased in comparison to an amount of reductant supplied to a reduction catalyst when the particulate matter is not combusted and removed. Accordingly, even though $NO_x$ conversion efficiency (e.g., activation level of catalytic component contained in a reduction catalyst), is decreased during particulate matter combustion and removal, supplying an increased amount of reductant can restrain the decrease of the reduction reaction rate, thereby compensating for the decreased activation level of the catalytic component contained in a reduction catalyst, which results in avoidance of $NO_x$ release into atmosphere.

In an example embodiment, in said first mode, said first amount of particulate matter is combusted by supplying the exhaust gas of a first temperature to said filter, and in said second mode, said second amount of particulate matter is combusted by supplying the exhaust gas of a second temperature that is higher than said first temperature to said filter.

In one example, an internal combustion engine has a fuel injector which injects fuel directly into a combustion chamber, and wherein an end of fuel injection during a cylinder cycle in said second mode is retarded from that in said first mode.

In one example, this method further comprises, in the first mode, recirculating a first amount of exhaust gas from said exhaust passage upstream of said filter to an intake passage of said internal combustion engine and recirculating a second amount of exhaust gas that is less than said first amount from said exhaust passage upstream of said filter to an intake passage.

This may avoid the introduction of unburned fuel, which should have been burned off by the oxidation catalyst during burn off of the particulate matter in the particulate filter, into an air intake passage via an exhaust gas recirculation conduit. Accordingly, regeneration of the particulate filter can be better achieved by combustion of the unburned fuel.

However, when exhaust gas recirculation (EGR) is stopped, the amount of NOx emission is increased. To prevent this increased NOx emission to an atmosphere, an amount of supplied reductant can be increased when an amount of NOx emission is increased. Accordingly, the NOx reduction reaction with reductant can become sufficient, which results in avoidance of NOx emission into an atmosphere.

That is, during filter regeneration, even if there is a possibility that some NOx emission cannot be purified for two reasons, namely, decrease of NOx conversion efficiency of a reduction catalyst and increase of an amount of NOx emission from internal combustion engine, this example method can avoid NOx emission into an atmosphere.

In another example embodiment, said internal combustion engine has a fuel injector which injects fuel directly into a combustion chamber, and the method further comprises: in said first mode, supplying fuel from said fuel injector to said combustion chamber so that an end of the fuel injection during a cylinder cycle is a first timing during a cylinder cycle and recirculating a first amount of exhaust gas from said exhaust passage upstream of said filter to an intake passage of said internal combustion engine; and in said second mode, supplying fuel from said fuel injector to said combustion chamber so that an end of the fuel injection during a cylinder cycle is a second timing that is later than said first timing during a cylinder cycle and recirculating a second amount of exhaust gas that is less than said first amount of exhaust gas from said exhaust passage upstream of said filter to said intake passage.

In another example embodiment, this method further comprises increasing an amount of reductant supplied to a reduction catalyst as a desired torque of an internal combustion engine increases and increasing an amount of reductant supplied to a reduction catalyst as a speed of said internal combustion engine increases.

Since an amount of reductant supplied to a reduction catalyst is set according to a desired torque or a speed of said internal combustion engine such that an amount of reductant supplied to a reduction catalyst can correspond with an amount of NOx emission from an internal combustion engine that is changed depending on a desired torque or a speed of said internal combustion engine, this can promote a reaction between a reductant and NOx such that an amount of one of them is not much larger than the other, regardless of whether filter regeneration is carried out or not.

In another example embodiment, this method further comprises increasing an amount of reductant supplied to a reduction catalyst as a temperature of exhaust gas in said exhaust passage between a filter and a reduction catalyst increases.

Since an amount of reductant supplied to a reduction catalyst is increased as a temperature of exhaust gas in said exhaust passage between a filter and a reduction catalyst increases, an amount of reductant can be made to correspond with the degree of decrease in NOx conversion efficiency or degree of decrease in activation level of catalytic component contained in a reduction catalyst, which can promote a reaction between a reductant and NOx such that an amount of one of them is not much larger than the other, regardless of whether filter regeneration is carried out or not.

A second aspect of the present description includes a method of controlling a system having an internal combustion engine, a filter arranged in an exhaust passage and capable of trapping particulate matter contained in the exhaust gas from said internal combustion engine, a reduction catalyst arranged in said exhaust passage downstream of said filter and capable of reducing nitrate oxide contained in the exhaust gas with reductant supplied thereto, the method comprising: in a first mode, recirculating a first amount of exhaust gas from said exhaust passage upstream of said filter to an intake passage of said internal combustion engine and supplying a first amount of reductant to said reduction catalyst; and in a second mode, recirculating a second amount of exhaust gas that is less than said first amount of exhaust gas from said exhaust passage upstream of said filter to said intake passage and supplying a second amount of reductant that is greater than said first amount to said reduction catalyst in a second mode.

This method also overcomes at least some of the disadvantages of the above references.

For example, when the first mode is operated when particulate matter trapped in a particulate filter is combusted and removed (e.g., during filter regeneration), this method can avoid introducing unburned fuel to an oxidation catalyst to combust and remove a particulate matter, by rerouting the unburned fuel into an intake air passage via an EGR conduit. Accordingly, this can promote the performance of regeneration of particulate filter with combustion of unburned fuel.

However, when EGR is stopped, an amount of NOx emission is increased. To prevent this increased NOx emission to an atmosphere, an amount of supplied reductant can be increased when an amount of NOx emission is increased. Accordingly, the NOx reduction reaction with reductant can become sufficient, which results in avoidance of NOx emission into an atmosphere.

That is, during filter regeneration, even if there is a possibility that some NOx emission cannot be purified for two reasons, namely, decrease of NOx conversion efficiency of a reduction catalyst and increase of an amount of NOx emission from internal combustion engine, this example method can avoid NOx emission into an atmosphere.

A third aspect of the present description includes a system comprising: an internal combustion engine; a filter arranged in an exhaust passage and capable of trapping particulate matter contained in the exhaust gas from said internal combustion engine; a reduction catalyst arranged in said exhaust passage downstream of said filter and capable of reducing nitrate oxide contained in the exhaust gas with reductant supplied thereto; a reductant supplier which supplies reductant to said exhaust passage upstream said reduction catalyst; and a controller configured to control: in a first mode, said filter to combust a first amount of particulate matter trapped therein and said reductant supplier to supply a first amount of reductant when an amount of particulate matter trapped in said filter is less than a predetermined trapping amount; and in a second mode, said filter to combust a second amount of particulate matter trapped therein that is greater than said first amount of particulate matter and said reductant supplier to supply a second amount of reductant that is greater than said first amount of reductant when an amount of particulate matter trapped in said filter is greater than said predetermined trapping amount.

This system overcomes at least some of the disadvantages of the above mentioned reference in a same manner as first aspect described above.

In one example, said reductant supplier further comprises a tank accommodating urea solution to be supplied to said exhaust passage upstream said reduction catalyst.

The above advantages and other advantages, and features of the present description will be readily apparent from the following Detailed Description when taken alone or in connection with the accompanying drawings.

DETAILED DESCRIPTION

Figure 1:
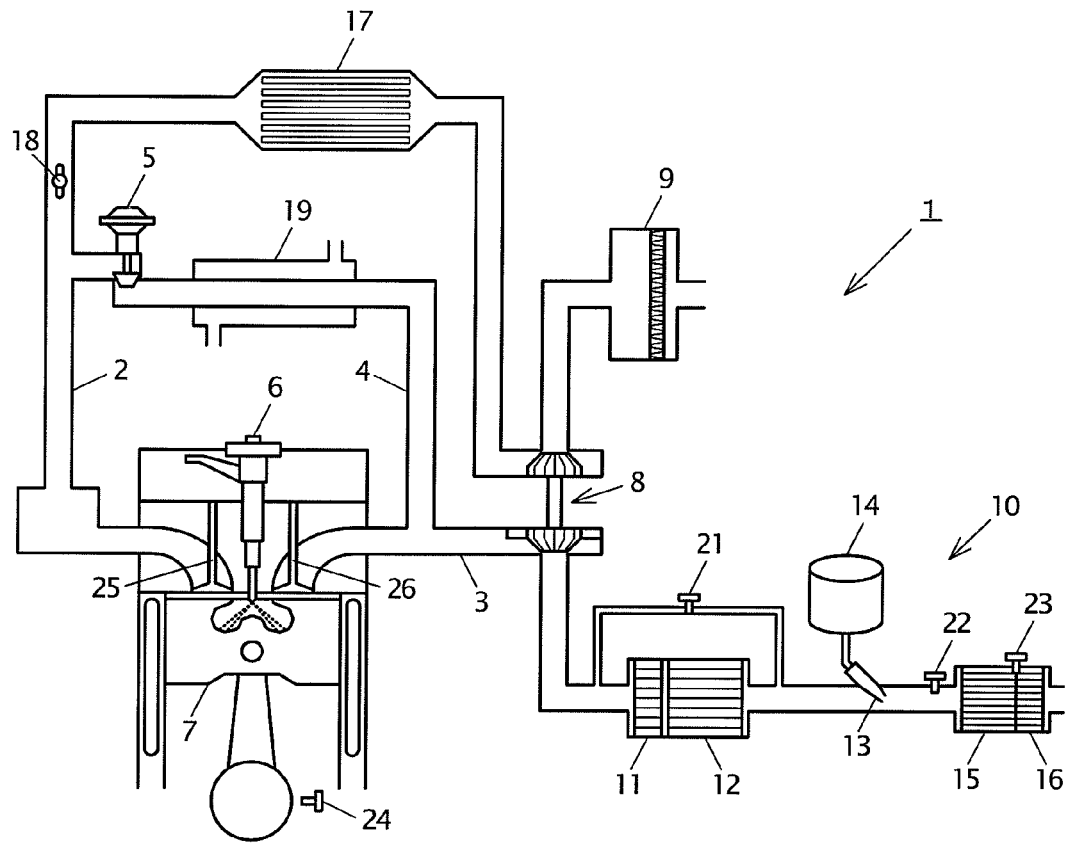
FIG. 1 is a block diagram of an entire exhaust-gas treatment system of an engine according to the best mode of an embodiment of the present invention.

FIG. 1 is a block diagram of an entire exhaust-gas treatment system 10 of an engine 1 according to an embodiment. In this embodiment, the engine 1 is a diesel engine, including an intake passage 2, an exhaust passage 3, an exhaust gas recirculation (EGR) passage 4 for returning a part of the exhaust gas to the intake passage 2, and an EGR valve (which is one example of an EGR means) 5 arranged in the EGR passage 4 for adjusting an opening of the EGR passage 4.

In the exhaust passage 3, from upstream side, an oxidation catalyst 11 for carrying out oxidization combustion of unburned fuel in the exhaust gas, a diesel particulate matter filter (DPF) 12 for trapping particulate matters in the exhaust gas, an urea injection nozzle (which is one example of an urea supplying means) 13 for injecting urea aqueous solution supplied from an urea aqueous solution tank 14 into the exhaust passage 3, and a SCR (Selective Catalytic Reduction) catalyst (reduction catalyst) 15 for reducing NOx in the exhaust gas when receiving the supply of the urea aqueous solution from the nozzle 13, and an ammonia oxidation catalyst 16 for preventing emission of a surplus amount of the ammonia generated from the urea aqueous solution injected from the nozzle 13 into the atmosphere (ammonia slip), are arranged in this order.

The EGR passage 4 connects the exhaust passage 3 upstream of the oxidation catalyst 11 and the intake passage 2.

Further in the exhaust passage 3, a differential-pressure sensor (which is one example of an exhaust particulate matter trapping amount detection means) 21 for detecting a differential pressure between an immediate upstream and an immediate downstream of the DPF 12, an exhaust gas temperature sensor 22 arranged immediate upstream of the SCR catalyst 15 for detecting a temperature of the exhaust gas flowing into the SCR catalyst 15, and an ammonia sensor 23 arranged between the SCR catalyst 15 and the ammonia oxidation catalyst 16 for detecting an ammonia concentration at immediate downstream of the SCR catalyst 15 (immediate upstream of the ammonia oxidation catalyst 16).

When the differential pressure detected by the differential-pressure sensor 21 is above a predetermined value, it means that an amount of the exhaust particulate matters trapped by the DPF 12 has reached a predetermined amount, and in a such case, it may be necessary to regenerate the DPF 12 by carrying out combustion and removal of the exhaust particulate matters trapped by the DPF 12.

In addition to those described above, there are shown in FIG. 1 a fuel injector 6 which injects fuel into a combustion chamber of the engine 1, a piston 7 which reciprocates in a cylinder in the well known manner and defines the combustion chamber with the cylinder, an intake valve 25, and an exhaust valve 26. There is also shown a variable geometry (VGT) turbocharger 8 which supercharges air into the combustion chamber. Further, there are shown in the intake passage 2 an air cleaner 9 arranged upstream of a compressor of the turbocharger 8, an intercooler 17 arranged downstream of the compressor of the turbocharger 8, and an intake throttle valve 18 arranged downstream of the intercooler 17 for throttling the charged and cooled air before induction into the combustion chamber when needed.

Specifically, the exhaust-gas treatment system 10 according to this embodiment includes an urea SCR system for reducing nitrogen oxide contained in the exhaust gas of the engine 1, and its treatment reaction mechanism is as follows.

First, as shown in the following Equation (1), urea in the urea aqueous solution injected from the urea injection nozzle 13 causes a thermally decomposing reaction by heat of the exhaust gas to generate ammonia and isocyanic acid. This thermally decomposing reaction starts at approximately 135 degrees C. or above, and mainly occurs in a section of the exhaust passage from the urea injection nozzle 13 to the SCR catalyst 16.

$$CO(NH_2)_2 \rightarrow NH_3 + HNCO \tag{1}$$

As shown in the following Equations (2) and (3), urea in the urea aqueous solution injected from the urea injection nozzle 13 and isocyanic acid generated by the thermally decomposing reaction cause a hydrolysis reaction to generate ammonia and carbon dioxide, respectively. This hydrolysis reaction starts at approximately 160 degrees C. or above, and mainly occurs in a section of the exhaust passage from the urea injection nozzle 13 to the SCR catalyst 15.

$$CO(NH_2)_2 + H_2O \rightarrow 2NH_3 + CO_2 \tag{2}$$

$$HNCO + H_2O \rightarrow NH_3 + CO_2 \tag{3}$$

Then, as shown in the following Equation (4), ammonia generated from urea causes a denitrating reaction with NO and $NO_2$, and returns these nitrogen oxides to nitrogen and water. This reducing reaction starts at approximately 200 degrees C. or above, and mainly occurs inside the SCR catalyst 15.

$$4NO + 2NO_2 + 4NH_3 \rightarrow 5N_2 + 6H_2O + O_2 \tag{4}$$

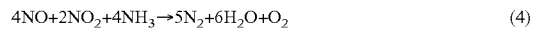

As shown in the following Equation (5), ammonia generated from urea causes a denitrating reaction with $NO_2$ under existence of oxygen to reduce this nitrogen oxide to nitrogen (its by-product is water). This reducing reaction starts at approximately 200 degrees C. or above, and mainly occurs inside the SCR catalyst 15.

$$2NO_2 + O_2 + 4NH_3 \rightarrow 3N_2 + 6H_2O \tag{5}$$

Here, if the Equations (4) and (5) are summarized, it will be as the following Equation (6). That is, a ratio of a concentration of NO in the exhaust gas and a concentration of $NO_2$ is efficient at a ratio of 1:1 with the highest reaction velocity.

$$NO + NO_2 + 2NH_3 \rightarrow 2N_2 + 3H_2O \tag{6}$$

As shown in the following Equation (7), surplus ammonia which is not reduced is decomposed into nitrogen and water under existence of oxygen. This oxidation reaction occurs inside the ammonia oxidation catalyst 16.

$$4NH_3 + 3O_2 \rightarrow 2N_2 + 6H_2O \tag{7}$$

Figure 2:
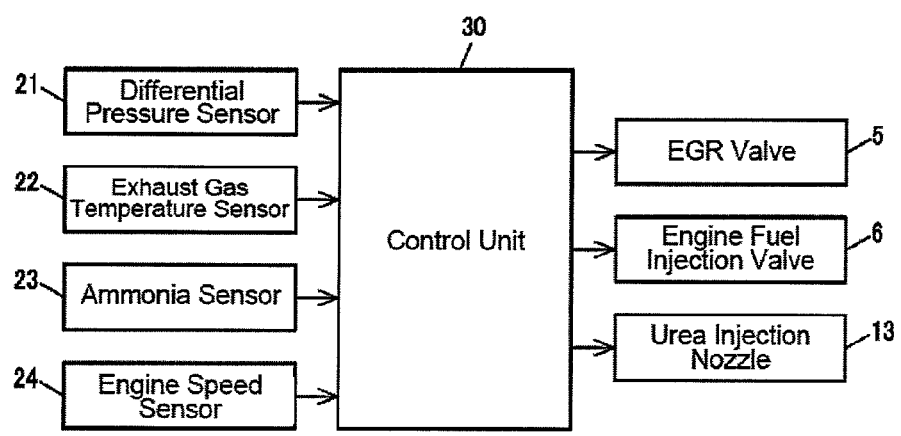
FIG. 2 is a view showing a control system of the exhaust-gas treatment system.

As shown in FIG. 2, a control unit 30 of the exhaust-gas treatment system 10 is inputted with a signal from the differential-pressure sensor 21, a signal from the exhaust gas temperature sensor 22, a signal from the ammonia sensor 23, and a signal from an engine speed sensor 24 for detecting an engine speed of the engine 1. The control unit 30 outputs control signals to the EGR valve 5, fuel-injection valves 6 of the engine 1, and the urea injection nozzle 13 according to the inputted results.

Figure 3:
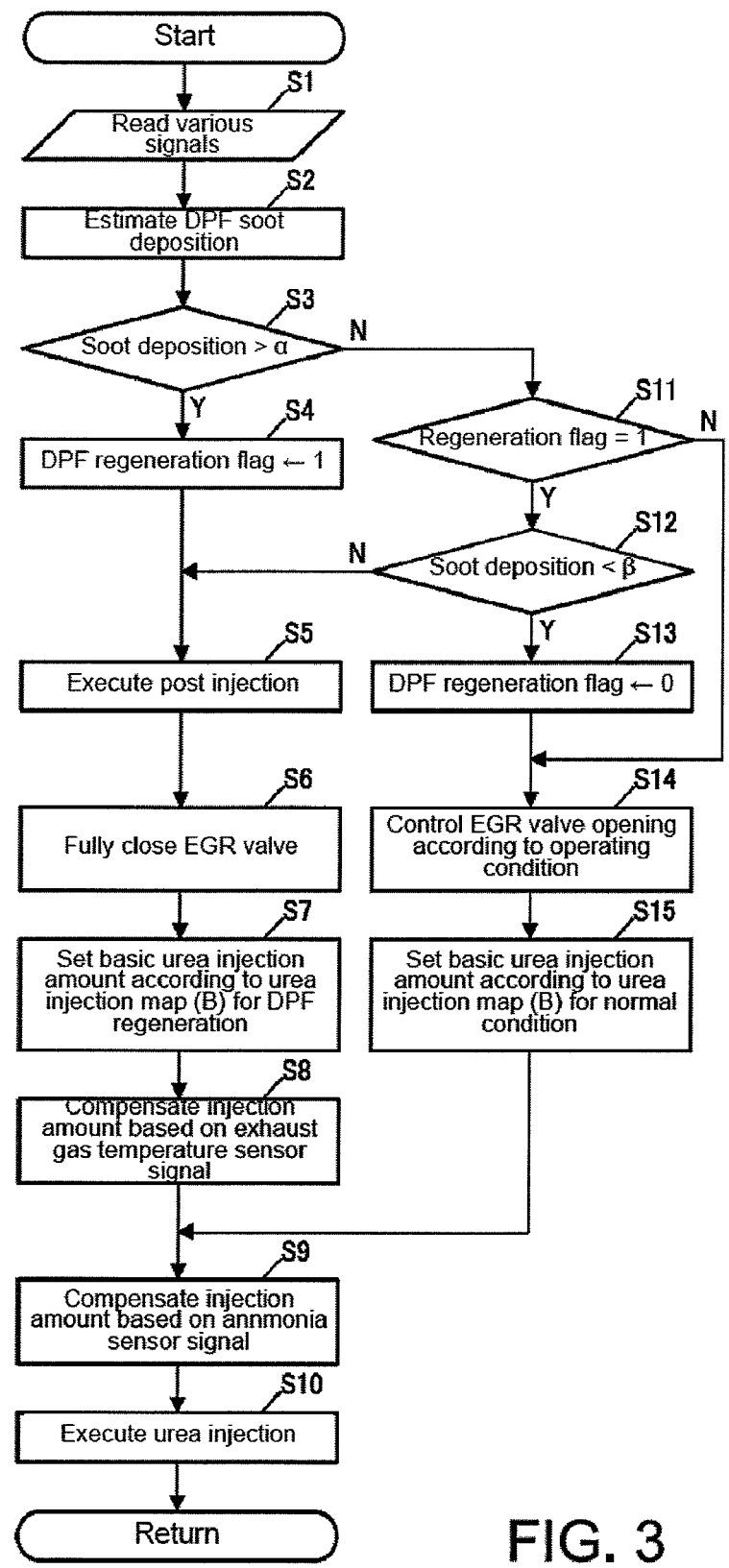
FIG. 3 is a flowchart showing an example of a control operation of the exhaust-gas treatment system.

FIG. 3 is a flowchart showing an example of a particular control operation performed by the control unit 30 of the exhaust-gas treatment system 10.

First, at Step S1, the control unit 30 reads the various input signals, and then at Step S2, it estimates an amount of deposition of the exhaust particulate matters (soot) trapped by the DPF 12 based on the signal from the differential-pressure sensor 21.

Then, at Step S3, the control unit 30 determines whether the amount of soot deposition is greater than a predetermined amount α. Here, the predetermined amount α is such an amount when clogging of the DPF 12 becomes remarkable, and an increase in resistance of the exhaust gas passing through the DPF 12 becomes excessive and thereby causing a great influence on power reduction of the engine 1.

As a result, when the amount of soot deposition is greater than the predetermined amount α, the control unit 30 sets a DPF regeneration flag to "1" at Step S4, and then at Step S5, the control unit 30 outputs control signals to the fuel-injection valves (which is one example of a fuel supplying means) 6 to perform post-injection.

Figure 4:
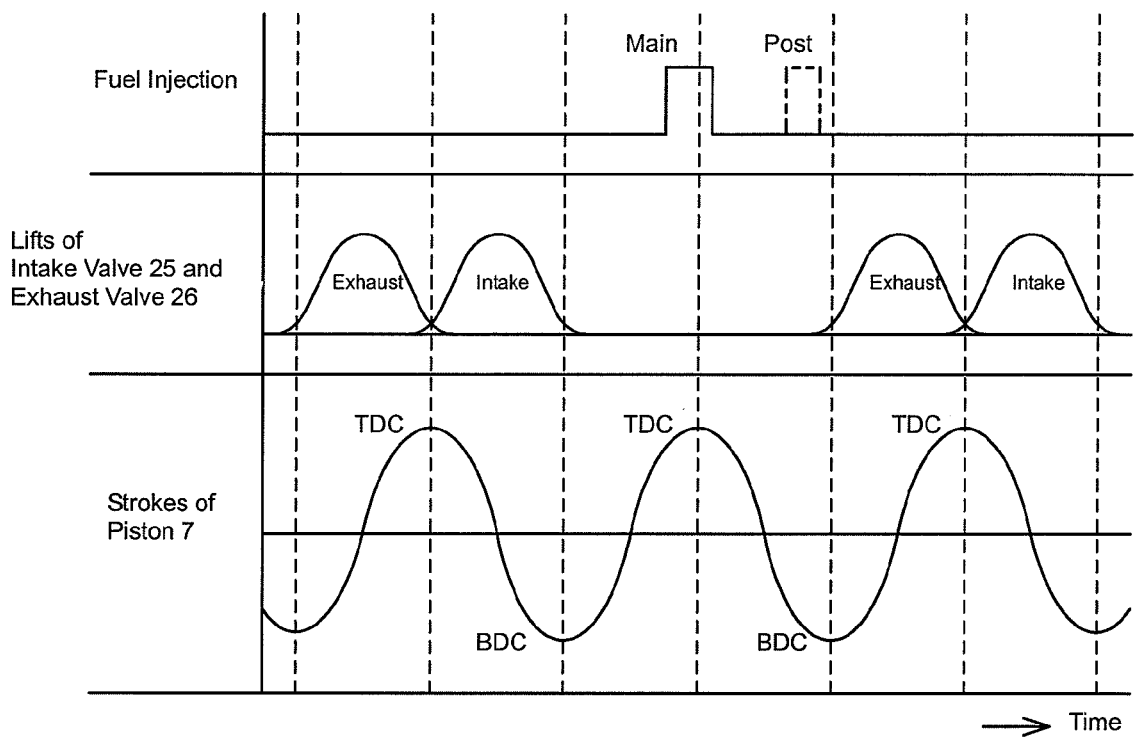
FIG. 4 is a chart showing exemplary fuel injections, intake and exhaust valve lifts and piston strokes.

As shown in FIG. 4, the post-injection is performed with a predetermined amount of fuel after an explosive combustion not to influence on the output of the engine 1. Thus, post-injected unburned fuel is discharged into the exhaust passage 3 from the engine 1 during an exhaust stroke, and then is combusted by the oxidation catalyst 11. The exhaust gas at a high temperature then flows into the DPF 12, and the exhaust particulate matters trapped by the DPF 12 are then combusted and removed. Thus, this is one example of a filter regenerating means.

As can be seen from FIG. 4, the post-injection is executed just before a bottom dead center (BDC) of an expansion stroke around a beginning of lift of the exhaust valve 26.

At Step S6, during the regeneration of the DPF 12 (i.e., when carrying out the combustion and removal of the exhaust particulate matters), the control unit 30 outputs a control signal to the EGR valve 5 to fully close the EGR valve 5. Thus, the return of the exhaust gas from the exhaust passage 3 to the intake passage 2 through the EGR passage 4 is stopped. Thus, this is one example of an EGR stopping means.

Further, at Step S7, during the regeneration of the DPF 12 (i.e., when carrying out the combustion and removal of the exhaust particulate matters), the control unit 30 outputs a control signal to the urea injection nozzle 13 to increase the injection amount of urea aqueous solution compared with at the time of non-regeneration of the DPF 12 (when not carrying out the combustion and removal of the exhaust particulate matters).

Figure 5:
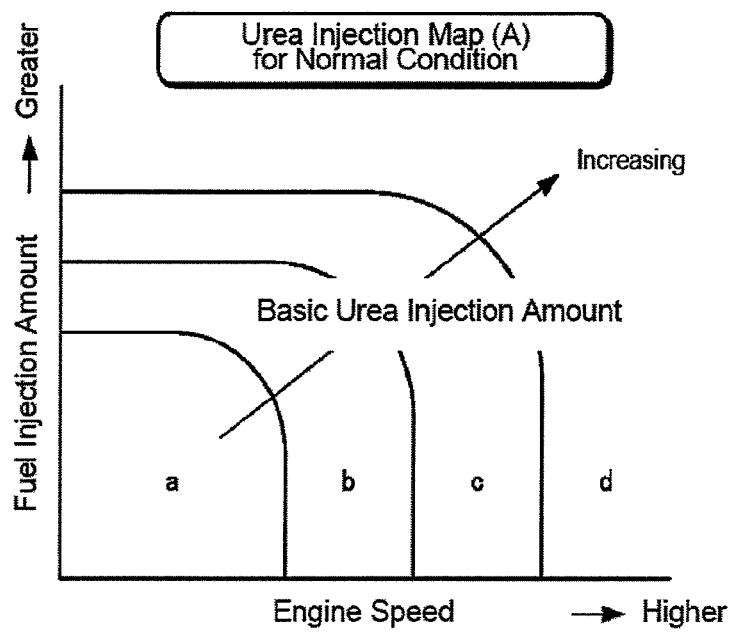
FIG. 5 is a view showing an example of an urea injection map (A) for normal condition used by the control operation.
Figure 6:
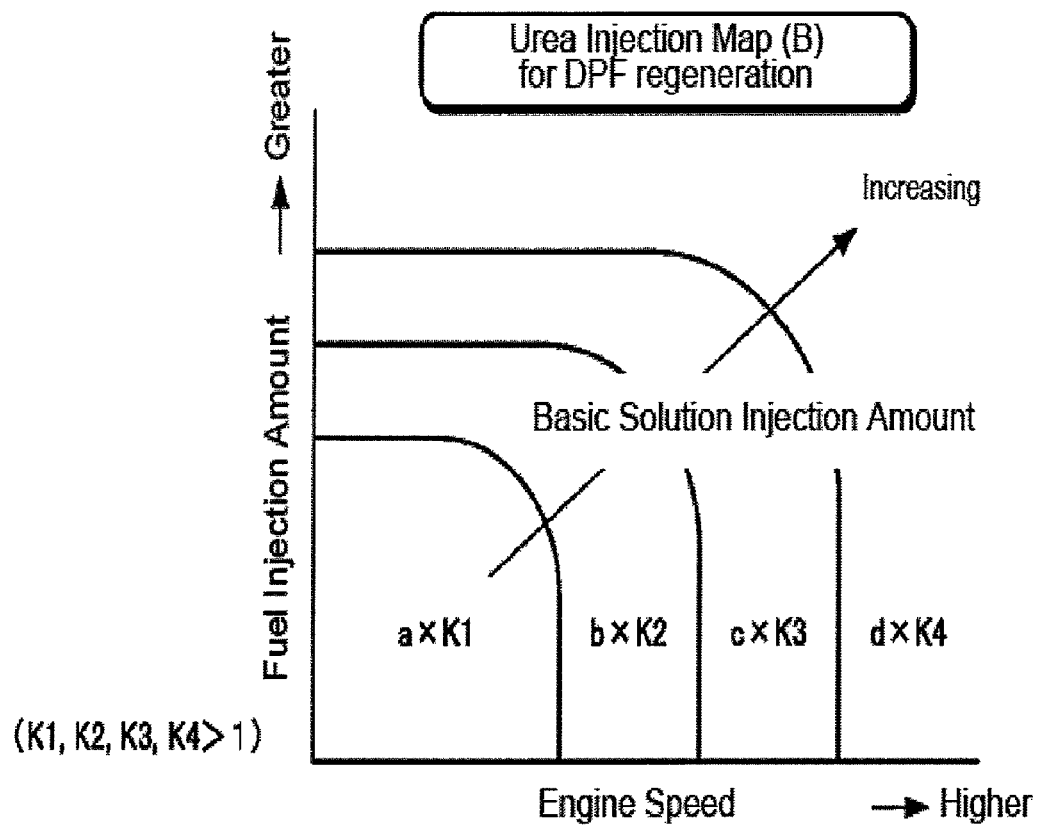
FIG. 6 is a view similarly showing an example of an urea injection map (B) for diesel particulate matter filter (DPF) regeneration.

More specifically described, in a memory (not shown) of the control unit 30, an urea injection map (A) for normal condition (for non-DPF regeneration) as illustrated in FIG. 5, and an urea injection map (B) for DPF regeneration as illustrated in FIG. 6 are stored.

In that case, for both of the maps (A) and (B), basic urea injection amounts are set corresponding to an engine speed and a fuel-injection amount (engine load), respectively. The basic urea injection amounts are in ascending order of a, b, c, and d (a<b<c<d), and ranges for the basic urea injection amounts a, b, c, and d are set in this order as the engine speed and/or the fuel-injection amount increases, as shown in FIG. 5.

In both of the maps (A) and (B), the fuel-injection amount is an amount of fuel injected before an explosive combustion to contribute to the output of the engine 1, without including the post-injection to cause combustion by the oxidation catalyst 11.

The urea injection map (B) for DPF regeneration, as illustrated in FIG. 6, is the same in division of the ranges of the basic urea injection amounts as the urea injection map (A) for normal condition, the basic urea injection amounts a, b, c, and d are multiplied by coefficients K1, K2, K3, and K4, respectively. Here, the coefficients K1, K2, K3, and K4 are all greater than 1. Therefore, the urea injection map (B) for DPF regeneration is set with increased values of the basic urea injection amounts comparing with the urea injection map (A) for normal condition.

Here, the coefficients are in ascending order of K1<K2<K3<K4. That is, the urea injection amount is increased as the engine speed and/or the fuel-injection amount increases. Of course, the relationship of the coefficients K1, K2, K3, and K4 may be different (for example, K1=K2=K3=K4).

At Step S7, the control unit 30 applies an engine speed detected by the engine speed sensor 24, and a fuel-injection amount (as described above, a fuel-injection amount injected before explosive combustion to contribute to the output of the engine 1 excluding the post-injection) to the urea injection map (B) for DPF regeneration illustrated in FIG. 6, to set the basic urea injection amounts (a×K1, b×K2, c×K3, or d×K4). As a result, the basic urea injection amounts with increased values will be set for DPF regeneration compared with that for non-DPF regeneration Thus, this is one example of an urea-supply-amount increasing means.

Subsequently, at Step S8, the basic urea injection amounts set at Step S7 are compensated based on the signal from the exhaust gas temperature sensor 22.

Figure 7:
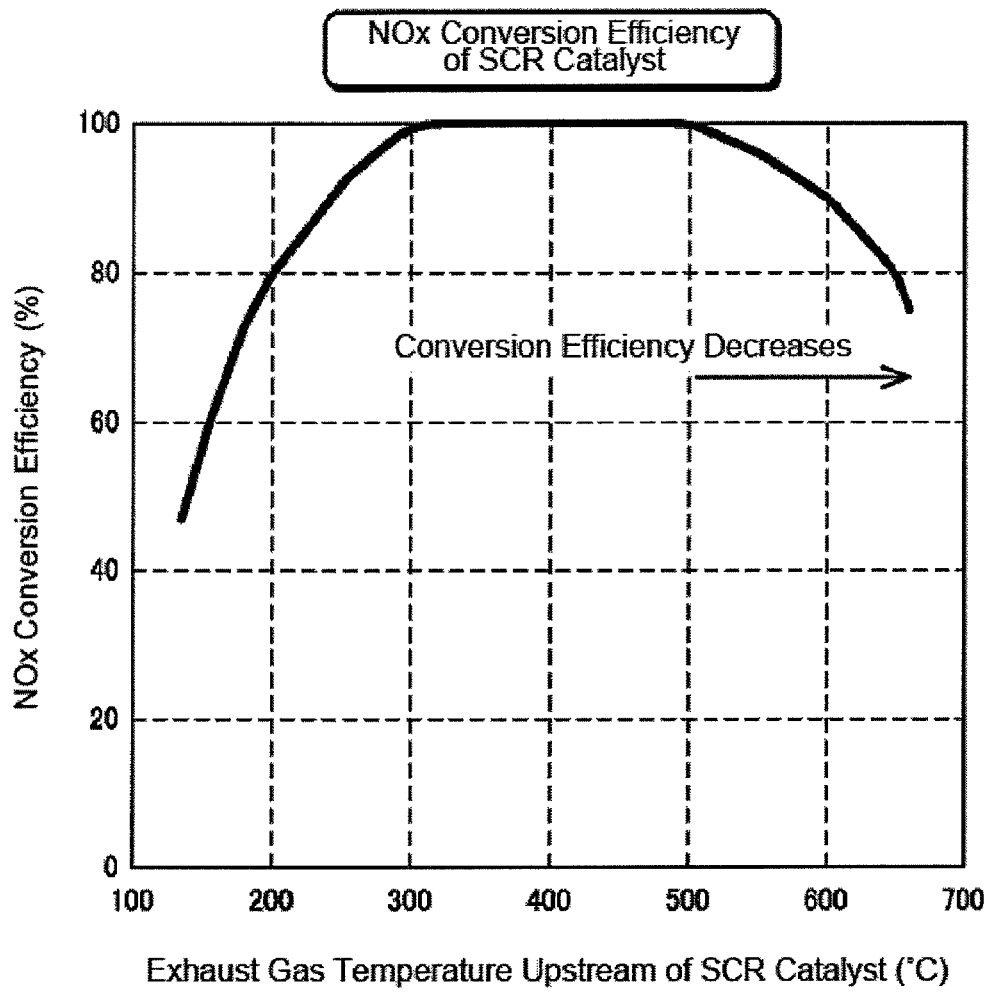
FIG. 7 is a view showing a relationship of a temperature of the exhaust gas flowing into a SCR catalyst and a NOx conversion efficiency of the SCR catalyst.

That is, as shown in FIG. 7, a NOx conversion efficiency of the SCR catalyst 15 (an activation level of a catalyst component, such as platinum (Pt) contained in the SCR catalyst 15) changes according to a temperature of the exhaust gas flowing into the SCR catalyst 15 (i.e., a temperature of the SCR catalyst 15), and the NOx conversion efficiency of the SCR catalyst 15 is approximately 100% at approximately 300-500 degrees C. The NOx conversion efficiency of the SCR catalyst 15 decreases from 100% as the temperature decreases from 300 degrees C. and the temperature increases from 500 degrees C.

At the time of non-DPF regeneration in which the exhaust particulate matters trapped by the DPF 12 are not combusted and removed, the temperature of the exhaust gas flowing into the SCR catalyst 15 is within a range of 300-500 degrees C. On the other hand, at the time of DPF regeneration in which the exhaust particulate matter trapped by the DPF 12 are combusted and removed, the temperature of the exhaust gas flowing into the SCR catalyst 15 is above 500 degrees.

For the urea injection map (A) for normal condition illustrated in FIG. 5 and the urea injection map (B) for DPF regeneration illustrated in FIG. 6, the basic urea injection amounts are set so that the NOx conversion efficiency of the SCR catalyst 15 is 100%. Therefore, at Step S8, the control unit 30 increasingly compensates the basic urea injection amounts set at Step S7, based on the temperature of the exhaust gas flowing into the SCR catalyst 15. As a result, for DPF regeneration, the urea injection amounts with further increasingly-compensated values compared with that for non-DPF regeneration is set. Thus, this is one example of an urea-supply-amount increasing means.

Subsequently, at Step S9, the control unit 30 compensates the urea injection amount set at Step S8, based on the signal from the ammonia sensor 23.

That is, in the SCR catalyst 15, if a reaction of ammonia as a reductant generated from the urea aqueous solution injected into the exhaust passage 3 from the urea injection nozzle 13 with NOx in the exhaust gas are carried out in a good condition without either one is not excessive or much less than the other, ammonia will not be discharged from the SCR catalyst 15. Therefore, ammonia is not detected by the ammonia sensor 23 for detecting the ammonia concentration immediate downstream of the SCR catalyst 15. However, if either one is excessive or much less than the other in the reaction between ammonia and NOx in the SCR catalyst 15, ammonia will be discharged from the SCR catalyst 15 especially when the injection amount of urea aqueous solution is excess to make ammonia being surplus, and then, ammonia will be detected by the ammonia sensor 23.

Therefore, at Step S9, the control unit 30 increasingly compensates the urea injection amount set at Step S8, based on the ammonia concentration immediate downstream of the SCR catalyst 15 detected by the ammonia sensor 23 Here, the compensation is not necessary when the ammonia concentration is detected as zero by the ammonia sensor 23. As a result, it can be avoided that excessive amount of ammonia is discharged from the SCR catalyst 15 due to the excessive amount of the urea injection by the urea injection nozzle 13.

Even if excessive ammonia is discharged from the SCR catalyst 15, because the excessive ammonia is decomposed into nitrogen and water by the ammonia oxidation catalyst 16 as described above, the ammonia slip can be controlled.

At Step S10, the control unit 30 outputs a control signal to the urea injection nozzle 13 so that urea aqueous solution is injected into the exhaust passage 3 by the urea injection amount set at Step S9, and the control unit 30 then returns to Step S1.

On the other hand, when the amount of soot deposition is not greater than the predetermined amount α at Step S3, the control unit 30 determines whether the DPF regeneration flag is set to "1" at Step S11. If the flag is set to "1" (under regeneration of the DPF 12), the control unit 30 then determines whether the amount of soot deposition is less than the predetermined amount β at Step S12. Here, the predetermined amount β is a amount when the clogging of the DPF 12 is almost dissolved, the increase in resistance of the exhaust gas passing through the DPF 12 is almost disappeared, and the power reduction of the engine 1 is hardly affected (for example, approximately "zero").

As a result, when the amount of soot deposition is less than the predetermined amount β, the DPF regeneration flag is reset to "0" at Step S13. Then, the control unit 30 outputs a control signal to the EGR valve 5 at Step S14 without performing the post-injection to control an opening of EGR valve 5 according to an operating condition (EGR control for normal condition).

At Step S12, when the amount of soot deposition is not less than the predetermined amount β, the control unit 30 proceeds to Step S5, and then continues the regeneration of the DPF 12.

When the DPF regeneration flag is not set to "1" at Step S11 (under non-regeneration of the DPF 12), the control unit 30 skips Steps S12 and S13, and it then proceeds to Step S14.

At Step S15, the control unit 30 applies the engine speed detected by the engine speed sensor 24, and the fuel-injection amount (as described above, the fuel-injection amount injected before explosive combustion to contribute to the output of the engine 1 excluding the post-injection) to the urea injection map (A) for normal condition illustrated in FIG. 5. Thus, the basic urea injection amount (any one of a, b, c, and d) is set.

Subsequently, at Step S9, the control unit 30 compensates the basic urea injection amounts set at Step S15, based on the signal from the ammonia sensor 23 for the same reason as the above.

At Step S10, the control unit 30 outputs a control signal to the urea injection nozzle 13 so that urea aqueous solution is injected into the exhaust passage 3 by the urea injection amount set at Step S9, and the control unit 30 then returns to Step S1.

The operation obtained by the above control will be explained with reference to a timing chart of FIG. 8.

First, in the normal condition where regeneration of the DPF 12 is not performed (Step S13), the control unit 30 performs the EGR control for normal condition (Step S14). Therefore, the amount of NOx emission immediately after discharge from the engine 1 to the exhaust passage 3 is at a relatively low level as illustrated by a solid line (1).

In addition, in the normal condition where regeneration of the DPF 12 is not performed, the post-injection is not performed. As a result, the temperature of the exhaust gas flowing into the SCR catalyst 15 would not excessively increase (in the example of FIG. 7, above 500 degrees C.). Therefore, the NOx conversion efficiency of the SCR catalyst 15 does not decrease, but is maintained at approximately 100%.

Thus, as illustrated by a two-dot chain line (2), in the normal condition where regeneration of the DPF 12 is not performed, the urea injection amount is set according to the urea injection map (A) illustrated in FIG. 5. As a result, the amount of NOx emission immediately after passing through the SCR catalyst 15 can be reduced down to a very low level.

On the other hand, during the DPF regeneration where regeneration of the DPF 12 is performed (Step S4), unburned fuel is post-injected to make it combusted by the oxidation catalyst 11 (Step S5). Then, in order to prevent the unburned fuel from escaping into the intake passage 2, the EGR valve 5 is fully closed and thereby EGR is stopped (Step S6). Therefore, the amount of NOx emission immediately after discharge from the engine 1 to the exhaust passage 3 is at a relatively high level as illustrated by a dotted line (3).

If the temperature of the exhaust gas flowing into the SCR catalyst 15 still does not excessively increase (in the example of FIG. 7, above 500 degrees C.), the NOx conversion efficiency of the SCR catalyst 15 does not decrease but is maintained at approximately 100%. Therefore, even if the urea injection amount is set according to the urea injection map (A) for normal condition illustrated in FIG. 5, the amount of NOx emission immediately after passing through the SCR catalyst 15 can be reduced to a low level to some extent, as illustrated by a dashed line (4).

However, in fact, during the DPF regeneration, the post-injection is performed. As a result, the temperature of the exhaust gas flowing into the SCR catalyst 15 excessively increases (in the example of FIG. 7, above 500 degrees C.). Here, because the NOx conversion efficiency of the SCR catalyst 15 decreases to less than 100%, when the urea injection amount is set according to the urea injection map (A) for normal condition illustrated in FIG. 5, the amount of NOx emission immediately after passing through the SCR catalyst 15 cannot be reduced to a much lower level as illustrated by a chain line (5).

Therefore, in the above-described control, during the DPF regeneration, the urea injection amount is increased using the coefficients K1, K2, K3, and K4 compared with the normal condition (Step S7). Thus, as illustrated by the chain line (5), the amount of NOx emission immediately after passing the SCR catalyst 15 which could not be reduced to the much lower level is decreased to a very low level as illustrated by the two-dot chain line (2).

Here, because the urea injection amount is amount-increasingly compensated based on the temperature of the exhaust gas flowing into the SCR catalyst 15 (Step S8), a decreased amount of the NOx conversion efficiency of the SCR catalyst 15 can be appropriately compensated.

Thus, in the exhaust-gas treatment system 10 of the engine 1 according to this embodiment, the DPF 12 for trapping the particulate matters in the exhaust gas, and the SCR catalyst 15 for reducing NOx in the exhaust gas while being supplied with urea, are arranged in the exhaust passage 3 of the engine 1 in this order from upstream side. In addition, at the time of combustion and removal of the exhaust particulate matters trapped by the DPF 12 (Step S4), the supply amount of urea is increased (Step S7) compared with that without combustion and removal (Step S13). Therefore, even if the NOx conversion efficiency of the SCR catalyst 15 (activation level of the catalyst component contained in the SCR catalyst 15) decreases to that at the time of combustion and removal of the exhaust particulate matters, the concentration of ammonia as a reductant increases. As a result, the decrease in the reaction velocity of ammonia and NOx is controlled (the decrease in the activation level of the catalyst component contained in the SCR catalyst 15 is compensated), and thereby the NOx emission into the atmosphere can be avoided.

On the other hand, at the time of combustion and removal of the exhaust particulate matters trapped by the DPF 12 (Step S4), the EGR valve 5 is fully closed (Step S6). Therefore, the unburned fuel to be combusted by the oxidation catalyst 11 for the combustion and removal of the exhaust particulate matters is avoided from escaping into the intake passage 2 through the EGR passage 4, and thereby the regeneration of the DPF 12 by combustion of the unburned fuel can be ensured.

Figure 8:
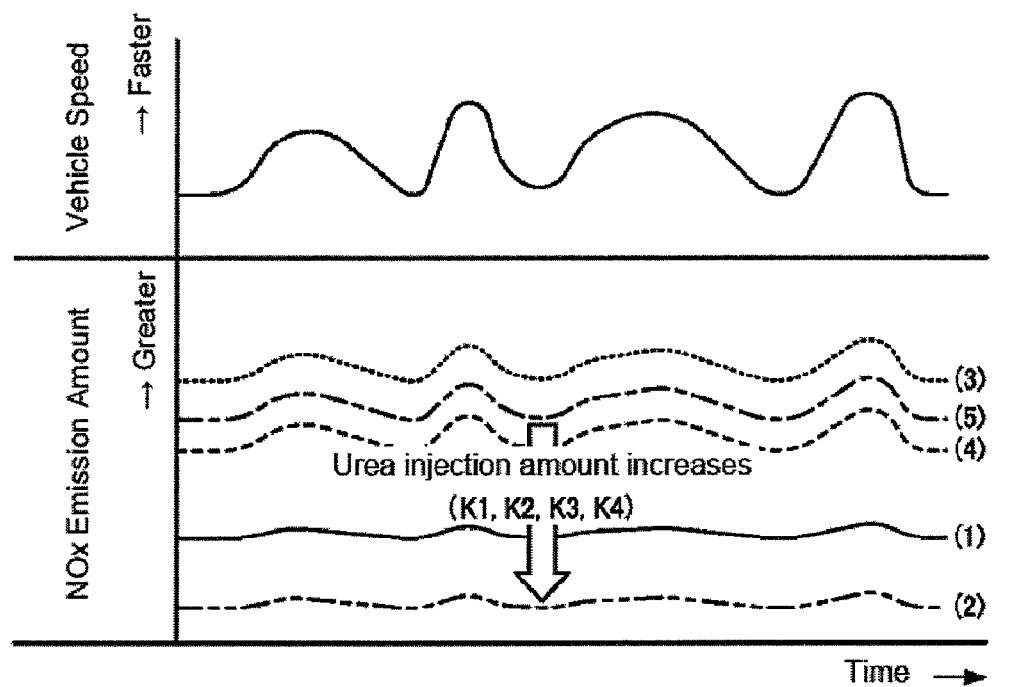
FIG. 8 is a timing chart showing an operation obtained by the control operation.

However, at the same time, the amount of NOx emission from the engine 1 increases due to the stopping of EGR (Step S6) as illustrated by a dotted line (3) of FIG. 8. Here, because the supply amount of urea is increased (Step S7), even if the amount of NOx emission from the engine 1 increases when carrying out the combustion and removal of the exhaust particulate matters, the concentration of ammonia as a reductant will increase, and the reduction of NOx by ammonia will fully be performed. As a result, the emission of NOx into the atmosphere can be avoided.

In other words, in this embodiment, during the regeneration of the DPF 12, NOx may not be treated for two reasons. One reason is that the NOx conversion efficiency of the SCR catalyst 15 decreases due to the increase in temperature of the exhaust gas (See FIG. 7). The other reason is that the amount of NOx emission from the engine 1 increases due to the stop of EGR (Step S6 of FIG. 3). Even in these cases, the emission of NOx into the atmosphere can be avoided.

As illustrated in FIGS. 5 and 6, the urea amount of supply from the urea injection nozzle 13 is set according to the engine speed and/or the engine load (fuel-injection amount). Therefore, it can appropriately handle the increasing and decreasing of the amount of NOx emission from the engine 1 according to the engine speed and/or the engine load. As a result, the reaction of ammonia and NOx can always be appropriately carried out even if either one is in excess or much less than the other, regardless of whether or not the regeneration of the DPF 12 is performed.

Further, the amount of urea supply during the regeneration of the DPF 12 is increased according to the temperature of the exhaust gas flowing into the SCR catalyst 15 (Step S8). Therefore, the decreasing level of the NOx conversion efficiency of the SCR catalyst 15 (activation level of the catalyst component contained in the SCR catalyst 15) can be appropriately handled. As a result, the reaction of ammonia and NOx can be appropriately carried out without either one being excessive or much less than the other during the regeneration of the DPF 12.

The above-described embodiment is the best mode of the present invention. However, the embodiment may be modified or changed without departing from the claims.

For example, in the above-described embodiment, the regeneration of the DPF 12 is achieved by the oxidation catalyst 11 and the post-injection from the engine 1. However, it may not be limited to this, but the DPF 12 may be directly increased in temperature using a heater, for example. In this case, because EGR is not necessary to be stopped even during the regeneration of the DPF 12, the amount of NOx emission from the engine 1 will not increase, and will thus be unlike those illustrated by the dotted line (3) of FIG. 8. However, because the NOx conversion efficiency of the SCR catalyst 15 may decrease due to the temperature increase in the exhaust gas to make the treatment of NOx impossible, the supply amount of urea should be increased during the regeneration of the DPF 12 compared with that of non-regeneration of the DPF 12.

In the above-described embodiment, the increase in the urea injection amount is carried out by multiplying the coefficients K1, K2, K3, and K4 (refer to FIG. 6). However, it is not limited to this, but the amount may be increased by other arithmetic methods.

Further, in the above-described embodiment, the division of the ranges of the urea injection amount is the same between the urea injection map (A) for normal condition in FIG. 5 and the urea injection map (B) for DPF regeneration in FIG. 6. However, it is not limited to this, but the division of the ranges may be changed.

Further, in the above-described embodiment, the increase in the urea injection amount is performed using the urea injection map (B) for DPF regeneration of FIG. 6. However, it is not limited to this, but a sensor for detecting the NOx concentration in the exhaust gas may be provided to the exhaust passage 3, and the control unit 30 may calculate the increased amount of the urea injection according to the detection result of the sensor, for example.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling a system having an internal combustion engine, a filter arranged in an exhaust passage, which traps particulate matter contained in exhaust gas from said internal combustion engine, a reduction catalyst arranged in said exhaust passage downstream of said filter and which reduces nitrate oxide contained in the exhaust gas with reductant supplied thereto, the method comprising:

in a first mode, combusting a first amount of particulate matter trapped in said filter and supplying a first amount of reductant to said reduction catalyst when an amount of particulate matter trapped in said filter is less than a predetermined trapping amount; and in a second mode, combusting a second amount of particulate matter trapped in said filter that is greater than said first amount of particulate matter and supplying a second amount of reductant that is greater than said first amount to said reduction catalyst when an amount of particulate matter trapped in said filter is equal to or greater than said predetermined trapping amount, wherein said internal combustion engine has a fuel injector which injects fuel directly into a combustion chamber, and the method further comprising:

in said first mode, supplying fuel from said fuel injector to said combustion chamber so that an end of the fuel injection during a cylinder cycle is a first timing during a cylinder cycle and recirculating a first amount of exhaust gas from said exhaust passage upstream of said filter to an intake passage of said internal combustion engine; and in said second mode, supplying fuel from said fuel injector to said combustion chamber so that an end of the fuel injection during a cylinder cycle is a second timing that is later than said first timing during a cylinder cycle and recirculating a second amount of exhaust gas that is less than said first amount of exhaust gas from said exhaust passage upstream of said filter to said intake passage.

2. The method as described in claim 1, further comprising:
increasing an amount of reductant supplied to said reduction catalyst as a desired torque of said internal combustion engine increases; and
increasing an amount of reductant supplied to said reduction catalyst as a speed of said internal combustion engine increases.

3. The method as described in claim 2, further comprising:
increasing an amount of reductant supplied to said reduction catalyst as a temperature of exhaust gas in said exhaust passage between said filter and said reduction catalyst increases.

4. The method as described in claim 1, further comprising:
increasing an amount of reductant supplied to said reduction catalyst as a temperature of exhaust gas in said exhaust passage between said filter and said reduction catalyst increases.

5. A system comprising:
an internal combustion engine;
a filter arranged in an exhaust passage and which traps particulate matter contained in exhaust gas from said internal combustion engine;
a reduction catalyst arranged in said exhaust passage downstream of said filter and which reduces nitrate oxide contained in the exhaust gas with reductant supplied thereto;
a reductant supplier which supplies reductant to said exhaust passage upstream said reduction catalyst; and
a controller configured to control:
in a first mode, said filter to combust a first amount of particulate matter trapped therein and said reductant supplier to supply a first amount of reductant when an amount of particulate matter trapped in said filter is less than a predetermined trapping amount; and
in a second mode, said filter to combust a second amount of particulate matter trapped therein that is greater than said first amount of particulate matter and said reductant supplier to supply a second amount of reductant that is greater than said first amount of reductant when an amount of particulate matter trapped in said filter is greater than said predetermined trapping amount, wherein said internal combustion engine has a fuel injector which injects fuel directly into a combustion chamber, and the method further comprising:

in said first mode, supplying fuel from said fuel injector to said combustion chamber so that an end of the fuel injection during a cylinder cycle is a first timing during a cylinder cycle and recirculating a first amount of exhaust gas from said exhaust passage upstream of said filter to an intake passage of said internal combustion engine; and in said second mode, supplying fuel from said fuel injector to said combustion chamber so that an end of the fuel injection during a cylinder cycle is a second timing that is later than said first timing during a cylinder cycle and recirculating a second amount of exhaust gas that is less than said first amount of exhaust gas from said exhaust passage upstream of said filter to said intake passage.

6. The system as described in claim 5, wherein said reductant supplier further comprises a tank accommodating urea solution to be supplied to said exhaust passage upstream said reduction catalyst.

7. The system as described in claim 5, further comprising:
increasing an amount of reductant supplied to said reduction catalyst as a desired torque of said internal combustion engine increases; and
increasing an amount of reductant supplied to said reduction catalyst as a speed of said internal combustion engine increases.

8. The system as described in claim 7, further comprising:
increasing an amount of reductant supplied to said reduction catalyst as a temperature of exhaust gas in said exhaust passage between said filter and said reduction catalyst increases.

9. The system as described in claim 5, further comprising:
increasing an amount of reductant supplied to said reduction catalyst as a temperature of exhaust gas in said exhaust passage between said filter and said reduction catalyst increases.

\* \* \* \* \*